United States Patent [19]

Brown

[11] Patent Number: 5,249,863
[45] Date of Patent: Oct. 5, 1993

[54] TEMPERATURE AVERAGING DATA LOGGER

[75] Inventor: Winthrop K. Brown, Bellaire, Tex.

[73] Assignee: Texaco Inc., White Plains, N.Y.

[21] Appl. No.: 994,236

[22] Filed: Dec. 21, 1992

Related U.S. Application Data

[63] Continuation-in-part of Ser. No. 835,875, Feb. 14, 1992, abandoned.

[51] Int. Cl.⁵ .......................... G01K 3/04; G01K 1/02
[52] U.S. Cl. ...................................... 374/102; 374/170
[58] Field of Search ................................ 374/102, 170

[56] References Cited

U.S. PATENT DOCUMENTS

| | | | |
|---|---|---|---|
| 3,719,071 | 3/1973 | Hohenberg | 374/144 |
| 4,298,947 | 11/1981 | Tamura et al. | 374/170 |
| 4,574,359 | 3/1986 | Ishisaka et al. | 374/107 |
| 4,586,149 | 4/1986 | Stillman et al. | 374/164 |
| 4,627,742 | 12/1986 | Sakamoto et al. | 374/170 |
| 4,634,294 | 1/1987 | Christol et al. | 374/170 |
| 4,636,093 | 1/1987 | Nagasaka et al. | 374/102 |
| 4,642,785 | 2/1987 | Packard et al. | 374/102 |
| 4,727,500 | 2/1988 | Jackson et al. | 374/102 |
| 5,019,760 | 5/1991 | Chu et al. | 374/102 |

FOREIGN PATENT DOCUMENTS

| | | | |
|---|---|---|---|
| 3139663 | 4/1983 | Fed. Rep. of Germany | 374/102 |
| 2385089 | 11/1978 | France | 374/102 |
| 0271432 | 12/1986 | Japan | 374/102 |

Primary Examiner—William A. Cuchlinski, Jr.
Assistant Examiner—Diego F. F. Gutierrez
Attorney, Agent, or Firm—James L. Bailey; Jack H. Park; Russell J. Egan

[57] ABSTRACT

A temperature averaging data logger measures temperature at regular intervals and continually displays the average of the measured temperatures. Upon being reset, the data logger displays the number of days since the last reset, the instant temperature, and then commences its temperature averaging mode.

1 Claim, 1 Drawing Sheet

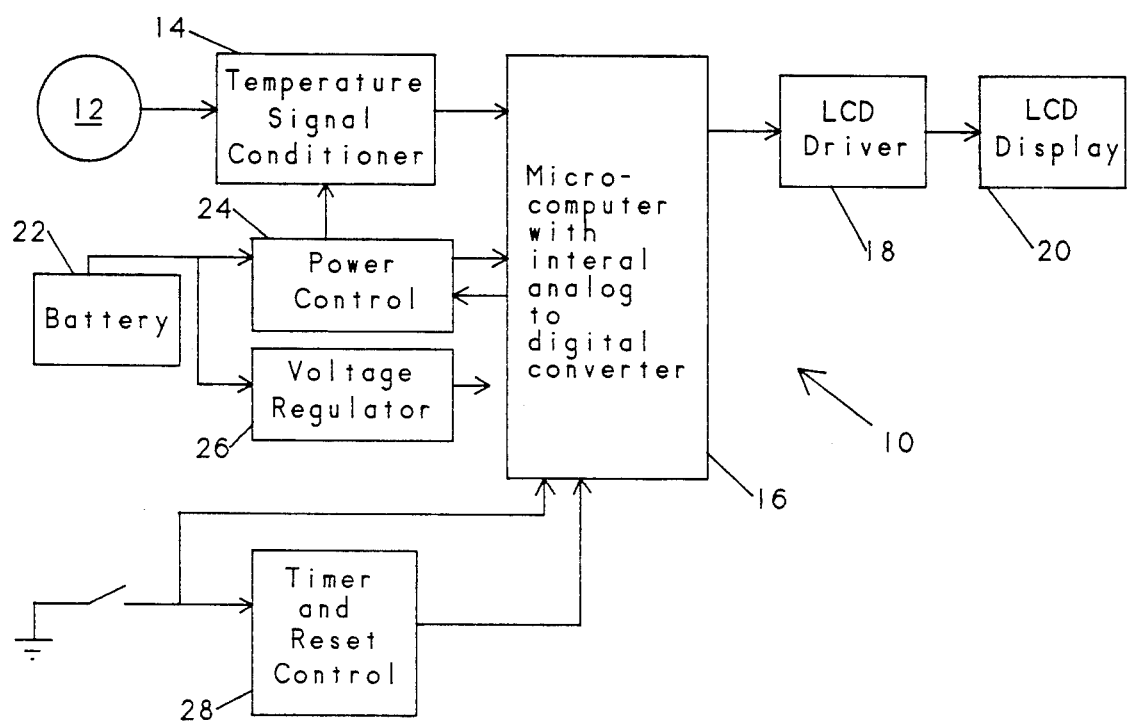

TEMPERATURE AVERAGING DATA LOGGER

CROSS REFERENCE TO RELATED PATENT APPLICATIONS

The present application is a continuation-in-part of my earlier patent application Ser. No. 07/835,875 filed Feb. 14, 1992, now abandoned.

BACKGROUND OF THE INVENTION

1. The Field of the Invention

The present invention relates to an instrument designed to measure temperature at periodic intervals and to calculate and display the average of those temperatures as well as the time period over which the averaging took place.

2. The Prior Art

There are many instances when it is desirable to know the average temperature as well as the time period over which the averaging takes place. This is particularly true when the recording instrument is located at a remote location which would be visited only at infrequent intervals. It is also desirable to be able to determine the instantaneous temperature at that location as well as to be able to reset the averaging operation. Many of the measuring and recording devices heretofore known have included some kind of recording device which accurately tracks the actual temperature, but which does little or nothing to satisfy the need for averaging out the temperature measurements without requiring the necessary mathematical calculations to arrive at an average temperature.

SUMMARY OF THE INVENTION

The subject data logger is an instrument designed to measure temperature at periodic intervals and to calculate an average of the measured temperatures. The present invention will be especially useful in metering applications in remote and infrequently visited locations and in conjunction with other measuring devices such as pressure recorders. The average temperature data is continuously displayed on an LCD and, upon reset, shows the number of days since the last time the instrument was reset. The display will also indicate battery condition and if the data logger has tried to measure temperatures beyond its range and/or average temperatures beyond a determined number of days without being reset.

BRIEF DESCRIPTION OF THE DRAWING

The present invention will now be described, by way of example, with reference to the accompanying drawing in which:

FIG. 1 is a block level schematic diagram of the present invention.

DETAILED DESCRIPTION OF THE INVENTION

The subject temperature averaging data logger measures the temperature at its probe at regular timed intervals. Each temperature reading is included into an average of all the temperature readings taken since the last time the data logger was reset. This average is displayed continuously in a readout window.

The subject data logger 10 includes a temperature sensor or probe 12 which senses temperature and generates a current proportional to the sensed temperature. This current is sent to a signal conditioner 14 which converts the temperature proportional current to 0-5 volt which in turn is input to an analog to digital converter portion of the microprocessor 16. The output of the microprocessor 16 is fed to an LCD driver 18 which in turn drives the liquid crystal display 20. The system is powered by a battery pack 22 through a battery control 24 and a voltage regulator 26. A 15-minute timer 28 controls the microprocessor 16 and is preferably provided with a manual reset. All components of the subject data logger are known and readily available. Therefor there is no need to describe the individual components in detail. All of these components would normally be mounted in a secure housing (not shown) providing environmental protection.

The subject data logger is normally in a sleep mode to conserve battery power. The temperature sensor 12 and signal conditioner 14 are only powered up periodically in order to make the temperature readings. This would normally be about every fifteen to thirty minutes, depending entirely upon the requirements of the site.

It is possible to reset the subject data logger by either of two means. In one version a button, switch or other manual means (not shown) would be provided for resetting the data logger. However, if the data logger is to be placed in an area where it might be subject to tampering, a more secure resetting means may be preferable. In this instance the data logger would preferably be provided with an internally mounted magnetically operated switch (not shown) requiring the placement of a permanent magnet (also not shown) on the exterior of the data logger housing to cause switch actuation and data logger reset. In either case, after reset, the data logger will display, for a measured short time period, the number of days since the last time the data logger was reset. The subject data logger will then resume display of average temperature reading commencing with the first or current temperature reading.

The subject data logger preferably includes known means to display an indication of the condition of the batteries. The battery condition is preferably monitored by comparator (not shown) built into the power control 24. The comparator output is sampled by the microcomputer 16, shortly after the power is applied to the temperature sensor signal conditioner 14 and the microcomputer is brought back from the power down mode. This allows the voltage to be sensed when the battery 22 is supplying its maximum load. Low battery condition is indicated by a means built into and displayed by the liquid crystal display 20. The preferred batteries used in the subject data logger are two 3.6 Volt lithium D cell batteries. Under normal operating conditions, these batteries would have an expected life of over ten years.

The subject data logger is preferably provided with means to indicate when the logger has tried to measure temperatures beyond a specific range and when it has passed a limit of the number of days over which it can average temperatures before requiring reset. The averaging is done by storing two values. One is the number of readings taken and the other is the sum of all of the readings. After each reading is taken (in the present case every 15 minutes) it is added to the sum. Then the sum is divided by the number of readings to get the average (while saving the sum and number of readings for future calculations). Error conditions are displayed (instead of average temperature) if the calculated temperature or number of readings exceed preset values. An error condition causes an "E" followed by the error number to be displayed by the liquid crystal display 20. The number of days since last reset value is displayed for a few seconds after each manual reset of the display for temperature. This value is calculated by dividing the number of readings registered by the number of readings per day. When the number of days is being displayed on the liquid crystal display 20, a "D" is displayed after the value.

The present invention may be subject to many modifications and changes without departing from the spirit or essential characteristics thereof. The present embodiment should therefore be considered in all respects as illustrative and not restrictive as to the scope of the invention.

I claim:

1. A data logger comprising:
   temperature sensing means for sensing a temperature;
   amplifier means responsive to said temperature sensing means for generating an output proportional to the sensed temperature;
   timer means for periodically activating the temperature sensing means;
   means for averaging the output from said amplifier means;
   means for resetting said averaging means in response to said timer means;
   means for manually resetting said averaging means;
   display means responsive to said averaging means for displaying the averaged output representing average sensed temperature;
   means for displaying on said display means the time period between each resetting of said averaging means;
   battery power supply means; and
   means in said power supply means for monitoring battery condition and for causing said condition to be displayed on said display means.

* * * * *